United States Patent [19]
Weinzierl et al.

[11] Patent Number: 4,757,352
[45] Date of Patent: Jul. 12, 1988

[54] METHOD OF MONITORING THE PICTURE TAKING OF ORIGINALS IN A MICROFILM CAMERA AND A MICROFILM CAMERA FOR CARRYING OUT THE METHOD

[75] Inventors: Manfred Weinzierl, Pfaffenhofen; Eberhard Zieran, Gruenwald, both of Fed. Rep. of Germany

[73] Assignee: Agfa-Gevaert AG, Leverkusen, Fed. Rep. of Germany

[21] Appl. No.: 90,225

[22] Filed: Aug. 27, 1987

[30] Foreign Application Priority Data

Sep. 2, 1986 [DE] Fed. Rep. of Germany ....... 3629760
May 9, 1987 [DE] Fed. Rep. of Germany ....... 3715501

[51] Int. Cl.$^4$ .............................................. G03B 27/52
[52] U.S. Cl. ......................................... 355/40; 355/64
[58] Field of Search ....................... 355/40, 41, 64, 54, 355/77; 354/109; 353/26 A, 26 R

[56] References Cited

U.S. PATENT DOCUMENTS 4,116,560 9/1978 Dragani et al. ...................... 355/41
4,577,956 3/1986 Klosterhuber et al. ............... 355/40

Primary Examiner—L. T. Hix
Assistant Examiner—D. Rutledge
Attorney, Agent, or Firm—Michael J. Striker

[57] ABSTRACT

To monitor the picture taking of documents in a camera assembly including a paging device and an exposure device, the documents pertaining to a partial stack of documents are provided with serial page numbers within a digital range assigned to the partial stack. In the exposure device the film pictures are exposed with a blip sign whose shape is assigned to the processed digital range. During the passage of respective documents through the assembly, an electronic control generates in the respective paging and exposure devices binary coded first and second signals assigned to the digital range of the serial numbers and to the corresponding blip signs. The first and second binary coded signals are applied via evaluation units and a comparator into an intermediate memory. After storing in the memory a predetermined count of the first and second signals, the comparator compares the same to reset the intermediate memory when an agreement has been detected or to generate an alarm signal when a disagreement is detected.

14 Claims, 5 Drawing Sheets

METHOD OF MONITORING THE PICTURE TAKING OF ORIGINALS IN A MICROFILM CAMERA AND A MICROFILM CAMERA FOR CARRYING OUT THE METHOD

BACKGROUND OF THE INVENTION

The present invention relates to a method for monitoring the picturizing of originals in a microfilm camera provided with a paging device and an exposure device whereby the originals are first provided with serial page numbers in the paging device and thereafter are picturized in the exposure device. During the exposure each film picture of an original is made with a light pulse or the so called blip code, whereupon in a comparing device the originals are compared with the completed film pictures and in the case of a non-agreement an error message is generated. The invention relates also to a microfilm camera for carrying out this method.

From DE Patent No. 3 220 977 a method of and a device for picture taking of non-sorted or disordered documents is described. To picturize a disordered series of documents the latter are first paged and subsequently correlated to a blip light pulse code and exposed with the blip pulses. In the paging mechanism a series of numerals is adjusted. The series of numbers includes numerals corresponding to an address of a picture on the film. The blip pulses are continuously registered, summed up and stored in an intermediate memory. During the exposure of the film with the picture of an original document the picture address number in a numerical series is compared with the blip pulses of the film picture in order to verify the agreement.

These measures serve for eliminating the errors which may occur during the paging and subsequent picture taking. It is desired to eliminate these errors by creating an unambiguous correlation between the address on the document and an address on the film picture. That means, that a defined correlation between a document and a corresponding film picture thereof is to be made in such a manner that a blip code for a document is compared in a comparison process with the corresponding address signal of the document only then when the corresponding document is present in the exposure device for picturizing.

Due to the non-negligible time interval between the paging device and the exposure device the numerals of the picture address must be correspondingly delayed with respect to the paging serial numbers in order to meet the condition for the comparison. For this purpose a synchronism between the assigned numerals of the document and the assigned blips of the film picture thereof, is established.

This known picture taking method and corresponding arrangement of the microfilm camera have the disadvantage that the comparison between the page serial numbers and the blip pulses is carried out individually for each document and in addition, the comparison process is individually delayed for each single document. It is true by this known method every check up of possible errors in the sequence of page numbers and blip numbers of individual documents can be made with greater reliability. Nevertheless it has the serious disadvantage that each document can be advanced only then when the page serial number of the preceding document had been compared, with the aforementioned delay with the blip serial number and when the preceding document is right in the exposure station. This has a further disadvantage that on the track between the paging device and the exposure device, an uninterrupted sequence of consecutive documents does not occur. Consequently, the big disadvantage of this known method and microfilm camera is the fact that it does not permit a high speed picture taking of a large quantity of documents. It is also disadvantageous that a delay circuit is necessary for guaranteeing that the comparison between the serial number of a document and the blip signal is performed in the exposure device only after the document has reached the exposure device.

SUMMARY OF THE INVENTION

It is therefore a general object of this invention to overcome the aforementioned disadvantages. In particular, it is an object of this invention to provide a method of monitoring the picture taking of documents which guarantees a friction-free and fast picturizing of any kind of original documents, whereby in order to increase the speed of the picture taking the individual comparison of respective addresses on the document with the corresponding film picture addresses is dispensed with. In other words, in feeding documents through the paging device and subsequently through the exposure device the correlation errors which may occur are not signalized immediately. Accordingly, for a fast advance of large quantities of documents fed in an uninterrupted succession in which a plurality of documents is transported one after the other between the paging device and the exposure device, the bringing up of each individual document is avoided.

A further object of this invention is to provide a microfilm camera arrangement for performing the novel method.

In keeping with these objects and others which will become apparent hereafter, one feature of this invention resides in the steps of providing each original during its passage through the paging device with a serial page number pertaining to one of predetermined digital ranges assigned to a group of documents being processed; generating in response to each actuation of the paging device a binary coded first electrical signal whose code corresponds to the current numerical range; then exposing the paged originals in said exposure device to make a film picture and simultaneously exposing on each film picture a blip code correlated to the current numerical range; generating in response to each actuation of the exposure device a binary coded second electrical signal whose code corresponds to the current blip code; storing the binary coded first and second electrical signal in an intermediate memory until a predetermined amount of the stored signals is reached; then reading out the stored signals and comparing in a comparator the first signals with the second ones; and issuing an error message if a disagreement between compared signals is detected or resetting the intermediate memory if an agreement is detected.

The microfilm camera for carrying out the method of this invention includes a paging device for applying the page serial numbers, an exposure device provided with a blip code exposure means to take picture of a document together with the blip code, an intermediate memory cooperating with a comparator, an electronic control including an evaluation unit for the paging device and an evaluation unit for the blip exposure device, the evaluation units inputting the binary coded first and second signals to the comparator and to the intermediate memory, means for reading out from the memory the stored first and second signals after a predetermined amount of the stored signals has been reached whereupon the comparator checks up the agreement between the read out first and second signals and issues an error message in the case of error and is reset when the signals are in agreement.

The novel method makes it possible that in an advantageous manner the check up of the agreement or coincidence of the binary coded signals by the comparator is carried out only after the storage of a predetermined amount of such signals indicative of the number of documents and of the number of film pictures. Upon detection of a coincidence with intermediate memory is reset and is immediately loaded by the subsequent group of process documents. In the case when during paging and/or during the subsequent picture taking in the exposure device an error occurs, then such an error is detected only in the following comparison after the predetermined amount of documents have been processed. That means that the individual documents are not brought up one at a time. Nevertheless, this has the advantage that the picture taking can be effected at a very high speed. Any error is detected latest during the next comparison process. With advantage each digital range and each correlated blip type or blip type combination are coded in corresponding signal formats.

In a further elaboration of this invention at least some of the digital ranges and the correlated blip types are introduced by means of control cards associated in advance with the documents whereby upon passage of a control card the comparison for agreement is started.

With advantage, each original is correlated in the paging device with a cooled number of the current digital range and the code of the blip series of the blip type in an ASCII-code and these codes are stored in corresponding registers in the intermediate memory. Only at the end of the picture taking of a stack of documents or after a predetermined number of documents the binary coded ASCII-signals stored in the registers pertaining to the paging device are compared with the second ASCII-signals stored in the registers pertaining to the exposure device. If the stored ASCII-coded signals in respective registers of the intermediate memory are equal then the correlation of the individual microfilm pictures to the documents is correct. As mentioned before, the individual check up of the correlation of numbers or characters of the series provided by the paging device and the characters or numbers of the blips is intentionally omitted for the sake of speeding up the picture taking. The resulting minute uncertainty is accepted in order to obtain high speed in picturing the individual documents without delays. If an error occurs then it is displayed at the end of picturizing of a stack or of a partial stack of the documents and picturing of the latter must be repeated. Considering the large increase of the processing speed and the relatively rare occurrence of interferences in the picture taking process, the possibility of repeating the picture taking of a predetermined amount of the documents in the case of an accidental error is acceptable; especially considering the fact in particular cases the operator can decide whether a repeated picture taking is really necessary or desirable.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF THE PREFERRED EMBODIMENTS

Figure 1:
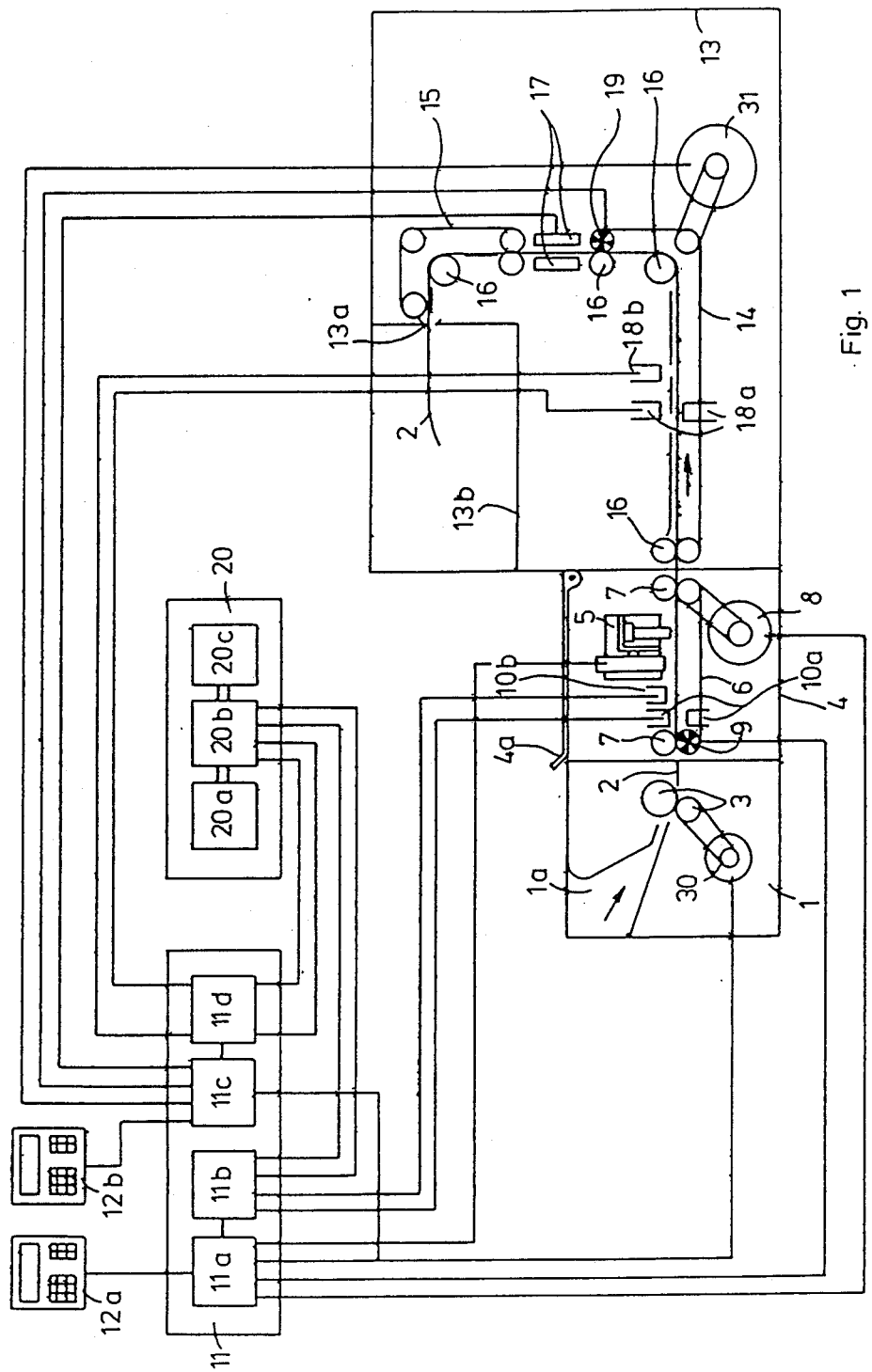
FIG. 1 is a schematic illustration of a microfilm camera of this invention.

The microfilm camera according to FIG. 1 is assembled of three mechanical subassemblies 1, 4 and 13 whose apparatuses are electrically driven and controlled by an electronic control.

A document feed-in device 1 which is immediately accessible by the user serves for feeding in originals or documents 2 to be picturized. The feed in device includes an inlet chute 1a for the documents and at least one pair of transport rollers 3. Instead of an inlet chute it is possible to use a staking device from which the documents are automatically drawn into the camera. Upon switching on the assembly by a non-illustrated main switch, the pair of transport rollers 3 is activated by an electric drive 30. The drive 30 is controlled, that means switched on and switched off by an electronic control 11 which will be described in greater detail below. From the feed in device 1 the processed original document 2 is transported into the second subassembly including the paging device 4 which in the case of high speed microfilm cameras can be in the form of an ink jet printer 5. In principle, however, other type of printers, such as electronically controlled impact printers can be used. For maintenance, the paging device is accessible through a top opening closed by a cover 4a. In paging device 4 the documents 2 which initially advance in horizontal direction are automatically marked in the printer 5 by consecutive serial numbers. To transport the documents 2 through the paging device 4 there is provided a circulating conveyor band 6, equipped at its opposite ends with transport rollers 7. The drive 8 for the conveyor band 6 is also controlled by the electronic control 11. In addition, there is provided a checking device 9 for detecting the speed of advance of the documents on the band 6 through the paging device 4. The checking device 9 is connected to the electronic control 11.

From the paging device 4, 5 the documents 2 after being paged are forwarded through a discharge slot into the third subassembly 13 which includes the actual non-illustrated microfilm camera inclusive of its objective, film and film transporting means. For the purposes of this invention, there is schematically illustrated only the exposure station 17 for the documents. This exposure station 17 also includes means for exposing on each film picture so-called blip light code. The exposure device also contains conveyor bands 14 and 15 with pressure rollers 16 and if desired with intermediate guiding surfaces for transporting the documents 2. The drive 31 for the conveyor band 14 is again connected to the electronic control 11. Before the exposure station 17, the conveyor band 14 is bent by 90° upward. Before the exposure station 17 is arranged an additional check up device 19 for sensing the speed of advance of a continuously moving document 2 and is connected to the electronic control 11. Both speed check up devices 9 and 19 serve for synchronizing the speed of advance through the paging device 4 with that through the exposure device 13. The upright conveyor band 15 at the outlet of the exposure station is also bent by 90° so that after exposure the document 2 is turned around 180° and discharged through an outlet slot 13a on a collecting desk 13b of the subassembly 13. The exposure subassembly 13 can be provided with suitable covers or removable partitions through which the camera transporting or check up parts are accessible for maintenance or repair. The camera in this example is designed such that the document 2 is continuously moved through the exposure station 17. In a modification it is also possible that the original document is first fully introduced into the exposure station 17 and momentarily stopped therein for exposure.

It is conventional to stack documents of different categories into corresponding partial stacks whereupon the partial stacks are superposed in a single stack of documents. The documents in respective partial stacks are marked in the printer 5 with distinctive main code characters to which different digital ranges of continuous page numbering by the printer 5 are assigned. For example, partial stacks containing documents related to personal matters obtain main code numeral 1, or partial stacks of documents pertaining to a counting obtain main code numeral 5; subdivisions of these partial stacks may obtain a second auxiliary code numeral, for example 1.3 or 5.2. For example, if from a partial stack which is to be marked by the main and auxiliary code number 5.2, already 3 5 4 0 documents had been picturized then a further partial stack to be processed may be marked by printed main and auxiliary code 5.2 and continuously printed with numbers 5 2 3 5 4 1 and so on. The main and auxiliary codes can be manually entered before the start of the processing of the partial stack. However, it is conventional to insert before a partial stack a control card provided with a corresponding bar code which is automatically sensed by the paging device 4 and the printer prints on the document the corresponding main and auxiliary codes. The starting number of a digital group which is to be continuously printed on a predetermined group of documents can be always entered manually by means of a keyboard 12a. In the following description the main and/or auxiliary codes will be described as digital ranges.

Moreover, it is also conventional to expose on individual microfilm pictures during the exposure of respective documents 2a so called blip or blip light code. Blips corresponding to film pictures in the current digital range are identical. However, when a new digital range is started then a different blip type (e.g., a longer one) is exposed on the film. In the following description the range of exposures allocated to another blip type either manually or by means of a control card will be referred to as a blip range. Therefore, it is necessary to indicate the beginning of a new partial stack either manually by means of a keyboard 12a for the paging device 4 and a keyboard 12b for the exposure device 13 or by means of a corresponding control card both in the paging device 4 before the printer 5 and in the exposure device 13 before the exposure station 17. Moreover, it may be desired to picturize a single stack of documents without subdivision into special categories and to continuously print the same series of page numbers. Even in this case the check up of individual documents for the continuous automatic application of the serial numbers in the paging device 4 and 5 is necessary.

Accordingly, for sensing the documents 2 both in the printer 5 and in the exposure station 17, there are provided sensing devices 10a and 18a in the form of a light barrier, for example to detect the occurrences of respective documents on the one hand, and code reading device 10b, 18b for reading bar codes on the control cards. The light barriers 10a and 18a are of the same type, and the bar code readers 10b and 18b are also identical.

This arrangement of sensors and code readers makes it possible to assign predetermined digital ranges of the printer 5 on the one hand, and blip ranges on the film on the other hand in accordance with the various categories of partial stacks of documents. However, this arrangement cannot check up the correctness of the order of documents or control cards passing from the paging device 4 to the exposure device 13, or the correctness of their numerical evaluation for the control of the blip exposure in correlation to the paging device. In the event of disturbances, such as for example, the printing of a new digital range without exposure of a new blip range, or if a document is stuck in transport or if a drive is disabled for example due to excessive slippage of a conveyor band, this arrangement is not designed for inactivating the whole assembly or release an optical or acoustical alarm signal. Accordingly, there is still the possibility to produce film pictures in which the blip ranges on the microfilm are not in agreement with the digital ranges in the documents, or fail to detect the slippage of a document in the apparatus or even the destruction of the documents before their picturizing. This shortcoming is avoided by the present invention. A difficulty resulted from the fact that the same document or control card passing from sensing or reading devices 10a and 10b reaches the sensing or reading devices 18 and 18b after a time interval. Hence, it must be guaranteed that the two sensing or reading devices evaluate the same document and not two different documents.

In order to insure in the examplary camera arrangement of FIG. 1 that each of the rapidly advancing documents 2 or control cards reaches both sensing and reading devices 10a, 10b, and 18, 18b without causing a mix up with a preceding or a subsequent document, the electronic control 11 and the control comparator 20 are modified as follows: the electronic control 11 includes a control unit 11a for the paging device, an evaluation unit 11b for the paging device, a control unit 11c for the camera and an evaluation 11b for the camera. The comparator 20 includes a comparing device 20b cooperating with an intermediate memory 20a for the paging device and another intermediate 20c for the camera. The comparing device 20b is interconnected with the evaluation unit 11b for the paging device and with the evaluation unit 11b for the camera and stores signal values in consecutive order in the corresponding intermediate memory 20a and 20c. After the completion of the passage of a stack of documents or after the passage of a predetermined batch or amount of documents, the stored signal values are read out and compared as to the agreement of the values from the paging device and the signal values from the camera. The control unit 11a for the paging device is interconnected with the conveyor band drive 8 in the paging device 4, with the printer 5, the speed check up device 9 and with the keyboard 12a for entering input data into the paging device. The camera control unit 11c is interconnected with transporting means in the exposure device 13, with the actual camera inclusive of the film transport, with the speed control device 19 and the keyboard 12b for entering data into the exposure device. The keyboards 12a and 12b can be equipped with visual displays for the paging or camera functions. The evaluation unit 11b of the electronic control is also connected with the sensing device 10a and the bar code reading device 10b and the camera evaluation unit 11b is connected with sensing device 18a and with the bar code reader 18b. In addition the control and evaluation units 11a and 11b for the paging device are interconnected with control and evaluation units 11c and 11d for the camera.

The operation of the camera arrangement according to FIG. 1 is as follows:

In this example, for different digital ranges to be used in paging device 4, 5 and for correlated blip ranges to be used in exposure station 17 of the camera, there are assigned control cards each provided with a bar code indicative of the digital range and recognizable by the evaluation units 11c and 11d. It is conventional to use two control cards one corresponding to a long and the other to a medium blip on the film whereby the main code digit or the auxiliary code digit at the printer is increased by one depending on the used control card. When a control card assigned to a partial stack of documents arrives to the first sensing unit 10a in the paging device then the unit signals the passage of a document to the paging evaluation unit 11b without recognizing the presence of a control card. Only the bar code reader 10b in the paging device reads the bar code on the control card and signals its contents to the paging evaluation unit 11b. The latter unit in turn sends the contents of the bar code in the form of an ASCII-signal to paging control unit 11a which controls the paging device to stop the control card therein until the last document from a stack indicated by the control card has passed through the camera and been discharged from the exposure device 13. Thereafter the control card is released from the paging device and transported into the exposure device 13 whereby the first sensing device 18a in the camera signals again the passage of a document without recognizing the control card and only the camera bar code reader 18b recognizes the arrival of the control card and reads the ASCII-bar code. The camera evaluation unit 11b in the electronic control receives the signals from the two camera sensing and code reading units 11a and 11b. In the case of an orderly passage of the control card through the camera both evaluation units 11b and 11d receive identical ASCII-coded signals. The latter signals are applied to the comparing device 20b of the comparator 20 and therefrom in consecutive order into corresponding intermediate memories 20a and 20c. After storing pre-set identical amounts of the ASCII-signals in respective intermediate memories 20a and 20c that means after a pre-set waiting time, the comparing unit 20b reads out the start signals and compares the signals from memory 20a with those from memory 20c. If an agreement between the two groups of signals is detected, then the comparing unit 20b signals this condition to control units 11a and 11c which instruct the paging and exposure devices to continue their operation for processing the documents of the current partial stack.

The electronic control 11 with its units 11a through 11d and the comparator 20 also determine the rate of the residual passage of documents preceding one control card and following a previously passed control card whether identical ASCII-signals had arrived from the paging device into the intermediate memory 20a and from the exposure device into the camera intermediate memory 20c. If after a preset number of picturized documents (for example after 10 or 25 documents) the identical number of mutually corresponding ASCII-signals is not present in the respective intermediate memories 20a and 20c that means one of the intermediate memories stores less signals than it is required for the read out and comparison in the comparing unit 20b, then the comparing unit 20b signals this shortage to the paging control unit 11a and camera control unit 11c. Consequently, the latter units depending on the design of the keyboards 12a and 12b activate thereon either alarm light signals or trigger acoustical signals, or immediately disactivate the drives in the paging and exposure devices. Consequently, the camera is either manually or automatically inactivated, thus avoiding faulty correlation between blip ranges in exposure device 13 and the digital ranges in paging device 4. The same process of triggering an alarm or of the automatic inactivation of the whole assembly would take place also in the case when a new control card is read for example by the paging bar code reader 10b only and for some reason or other is not read by the camera bar code reader 18b or vice versa; also in this case the documents following the control card would have received mismatched digital and blip ranges.

As mentioned before, it is possible to operate the camera assembly either with the aid of control cards or automatically without control cards and bar code readers 10b and 18b by using keyboards 12a and 12b for entering the corresponding coded signals. In the latter case when picturizing partial stacks of documents which start with a new digital and blip range, then the input data entered by keyboards 12a and 12b must correspond with each other. If for example a new digital range is opened by means of the paging keyboard 12a whereas no corresponding blip range is entered through the camera keyboard 12b then the first and second ASCII-coded signals which upon the receipt of signals from sensing units 10a and 11a reach via control units 11a and 11c the evaluation units 11b and 11d, and therefrom the intermediate memories 20a and 20c, differ from one another. As a consequence upon reading different ASCII-signals from the intermediate memories by the comparing device 20b, a disagreement is detected and alarm or the automatic disconnection of the camera is triggered. The alarm condition or the deenergized condition of the assembly can be removed only after the removal of the cause of the error and only then the picture taking can continue.

It can be seen that the described checking device for insuring an orderly advance of documents 2 and/or of preceding control cards, or for an orderly correlation of digital ranges on documents 2 and blip ranges on the microfilm pictures thereof, can be employed in multiple ways. For example it can be employed at a fully automatic operation, at a partial or an exclusive control of the paging and camera devices via the keyboards, at an automatic supply of documents from a single stack or partial stacks or when feeding in the document by hand. In the last case the supply of documents and/or control cards however is substantially slower. All these modes of operation have in common that a particular document releases at the paging sensing unit 10a and/or 10b and on the camera sensing unit 18a and/or 18b the same ASCII-signal whereby both ASCII-signals are stored via the units 11b, 11d in the corresponding intermediate memories 20a and 20c. The comparison in the comparing unit 20b occurs always after the passage of a control card or after the passage of a few stacks of documents or of a partial stack of documents or after a preset number of documents whereby the supply of documents to the paging device is momentarily switched off for a preset constant time interval (about 2.5 seconds) until the control card or the last document in the stack or partial stack is passed to the exposure station. Provided that two equal ASCII-signals determined by a control card or by equal numbers of documents within a preset range of a partial stack (for example within 8 or 10 or 20 documents) then the operation of the camera assembly keeps running. However, if the comparing device 20b detects unequal ASCII-signals or unequal amounts of the signals stored in the two intermediate memories 20a and 20b, then a warning for the user is triggered and/or an automatic inactivation of the whole assembly takes place until the cause of the malfunction is removed or the discrepancy such as for example the non-corresponding of the actuation of the two keyboards 12a and 12b is corrected. The parts of processed document stacks which had to pass through the camera assembly and had caused the error message can be reinserted into the camera and repicturized.

In practice it is advantageous to provide separate counters in respective evaluation units 11b and 11d and in respective intermediate memories 20a and 20c for the different types (marked, for example L, M, K or O) of the ASCII-signals so that altogether six or even eight counters are provided. The code type O) indicates intentionally deleted blips It is of particular importance that no comparison between the digital combinations printed on documents in paging device 5 and the digital combinations related to blip series on a microfilm picture of the corresponding document, takes place in the comparator 20. In this manner it is made possible that the paging device and the blip code exposing means can operate with different numbers and digital combinations. This can be of advantage for starting the processed documents according to subjects as desired by the user. By virtue of the batchwise comparison of the ASCII-signals delivered by the paging and blip exposure devices (instead of conventional comparison of digital combinations on individual documents) the processing speed is considerably increased.

Referring to the flow charts in FIGS. 2A through 2B, the detailed function of the camera assembly will be described.

Figure 2A:
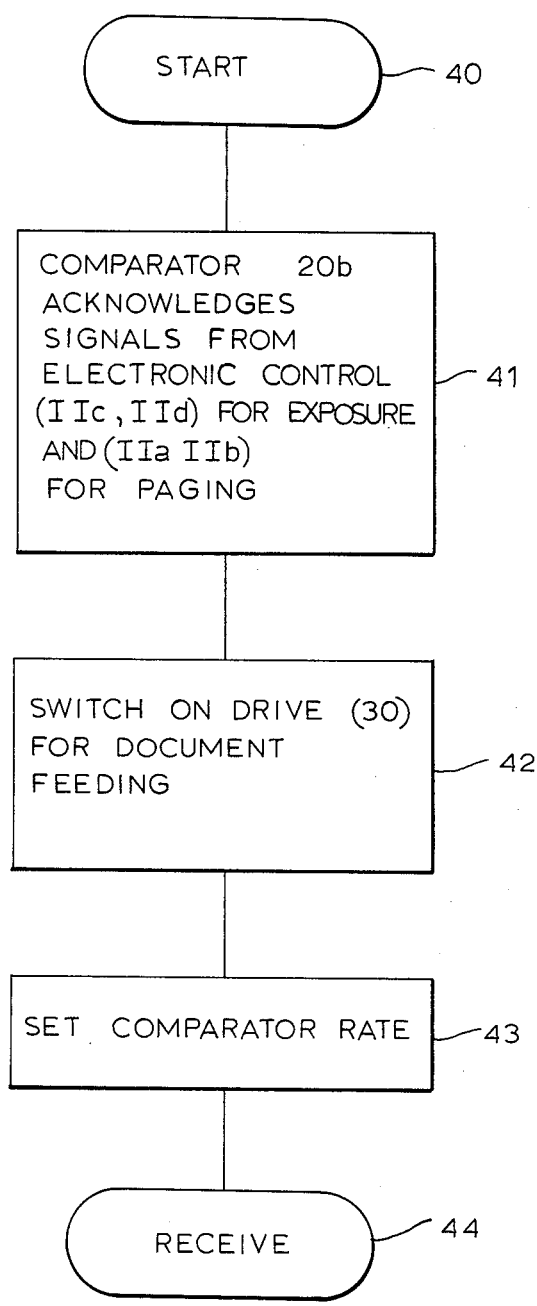
FIGS. 2A–2D show respectively flow charts of the operation of the camera of FIG. 1.
Figure 2B:
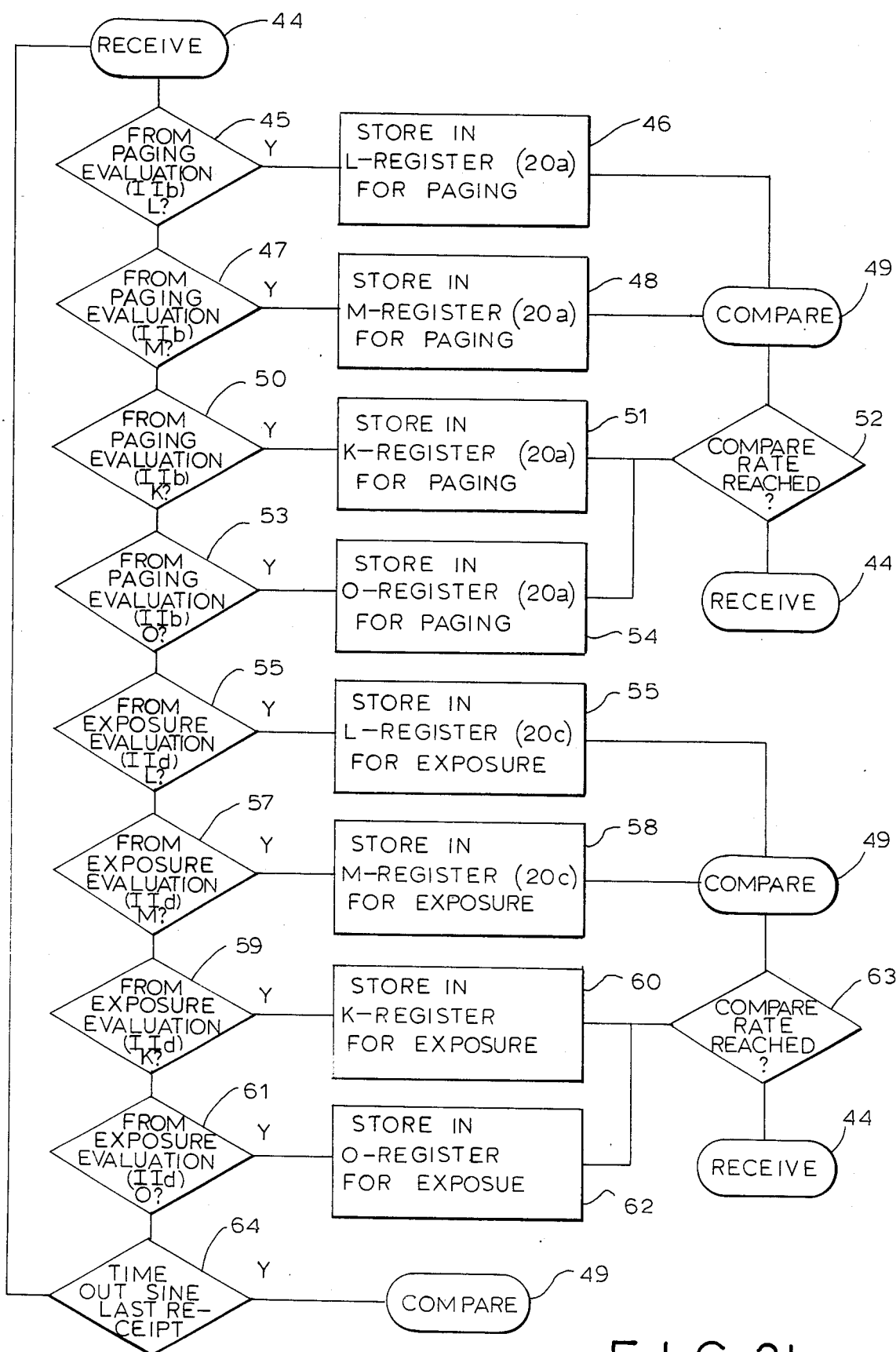

Referring to FIG. 2A, step 40 indicates the start of the microfilm camera assembly of this invention. In step 41, comparing device 20b compares signals from electronic control signals for the camera, namely the signals from the camera control unit 11c and from the camera evaluation unit 11b with those from the paging control unit 11a and paging evaluation unit 11b. If the result of the comparison is true then in step 42 the drive 30 for the document feed in device 9 is energized. Then in step 43 the comparator threshold is set that means the amount of documents in a stack after which a comparison will occur. After completion of steps 40 through 43, then a signal reception routine is initiated in step 44.

As mentioned before in connection with FIG. 1, there are four types ASCII-codes, namely L, M, K, O codes whereby the respective code types are counted in corresponding counters and stored in corresponding L, M, K and O registers of the paging intermediate memory 20a and in four corresponding L, M, K and O registers of the camera intermediate memory 20c. The L codes and the M codes are generated in the paging device in response to the reading of a corresponding control card assigned to a predetermined part of the documents. The K code is also determined by the control card depending on the design whereas a further K code is generated by the document itself. Referring to FIG. 2B which is a continuation of FIG. 2A, the step 44 as mentioned before, indicates that in the electronic control and the comparator of the camera is ready to receive signals. In step 45 it is tested whether an L code is present at the paging evaluation unit 11b. If it is present then in step 46 the corresponding L-signal in ASCII-coded form is stored in the L-register of the intermediate memory 20a for the paging device.

If no L-code is present then in step 47 it is tested whether an M-code is present in paging unit 11b. If this condition is true, then in step 48 the M-type ASCII-signal is stored in the M-register of the paging intermediate memory 20a.

Upon completion of steps 46 and 48 the signal reception routine 44 initiates in step 49 a comparison subroutine for the stored L and M types of binary coded signals start.

If in step 47 no M-code is ascertained then in step 50 it is tested whether the paging control unit 11b contains a K-code. If it does, then in step 51 the corresponding binary K-coded signal is stored in the K-register of intermediate memory 20a for the paging device and in the subsequent step 52 the comparing device 20b makes a test whether a preset threshold count of the stored signals has been reached or not. If the threshold count is detected then the comparing step 49 is executed. If the count of the stored signals is short of the threshold value then the process returns to the signal reception step 44.

If in step 52 no K-type code signal is detected then in the subsequent step 53 it is tested whether the paging evaluation unit 11b has detected an O-type code signal. If it does then the O-type ASCII-signal is stored in the O-register of the paging intermediate memory 20a.

If no O-type binary signal is present then in the following step 55 it is tested whether an L-type coded signal has been received by the camera evaluation unit 11b.

If yes, then the corresponding L-type binary signal is stored during step 56 in the corresponding L-register of intermediate memory 20c for the camera.

If no L-type binary signal is detected, then in step 57 it is tested whether the camera evaluation unit 11b has received an M-type code signal. If the M-type code signal is detected then in step 58 the corresponding M-type coded signal is stored in the M-register of the camera intermediate memory 20c. After completion of the steps 56 and 58, a comparison routine is initiated in step 49, as shown in the flow chart of FIG. 2C.

If no M-type code is ascertained during step 57, then in the following step 59 it is tested whether a K-type code has been received by the camera evaluation unit 20b. If yes, then in step 60 the corresponding signal is stored in the K-register of the camera intermediate memory 20c.

If no K-type code is detected then in the subsequent step 61 it is tested whether an O-type code has been received by the camera evaluation unit 11b. If yes, then a corresponding signal is stored in the O-register of the camera memory 20c during the step 62. Upon completion of step 60 and 62 it is tested in step 63 whether the preset comparison rate or comparison threshold count has been reached. If yes, then comparison routine 46 is carried out whereas in the opposite case the process is returned to step 44.

If no O-type code is detected during step 61 then in step 64 it is tested whether since the last receipt of a code type a predetermined time interval (time out) has elapsed or not. If the time interval has passed, then the process jumps to the comparison subroutine 49 whereas in the opposite case it returns to the signal reception routine 44.

The individual steps are performed in synchronism with clock signals generated by a non-illustrated clock signal oscillator.

Figure 2C:
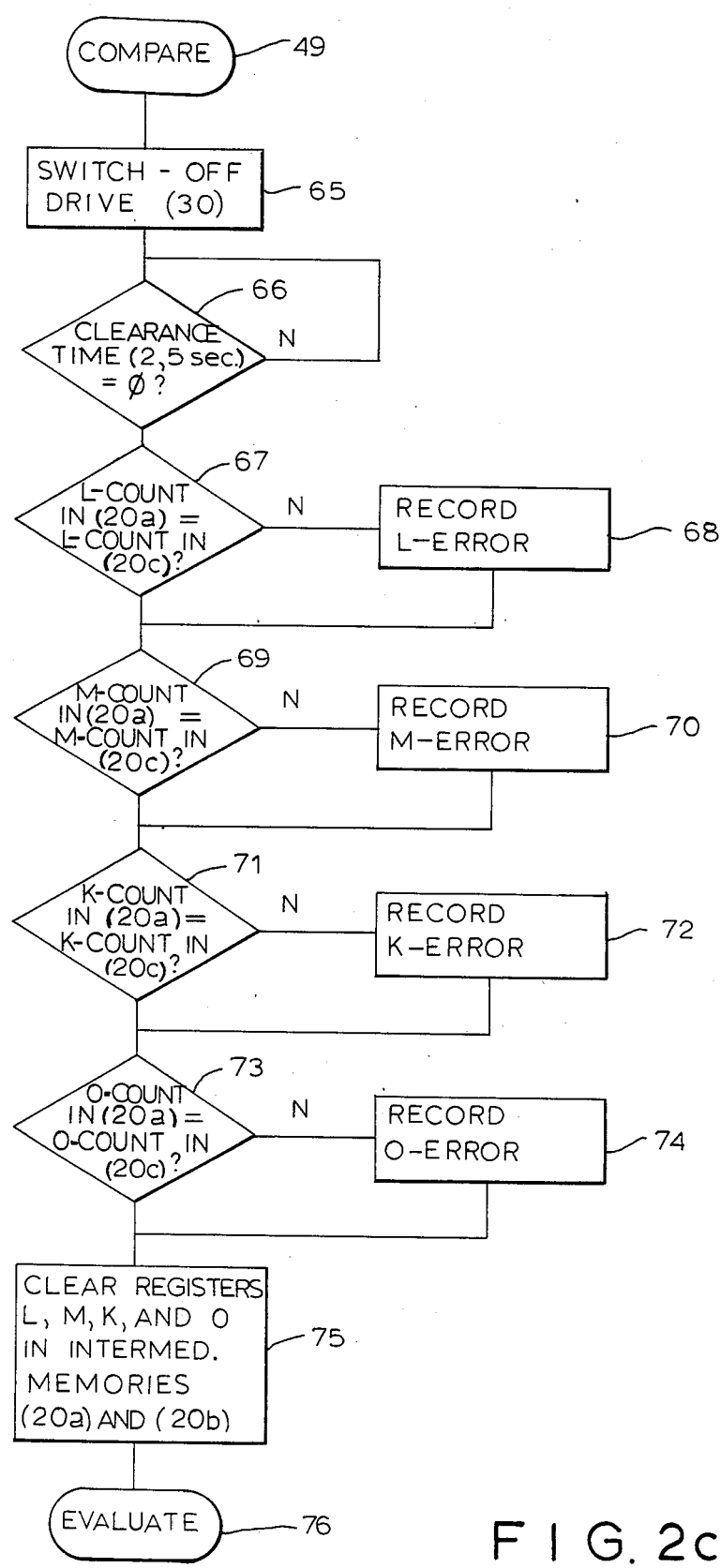

According to FIG. 2C the comparison subroutine runs as follows: As mentioned in connection with FIG. 2B, the comparison subroutine is started during the step 49. After the preset threshold count in the intermediate memory has been reached, then in the subsequent step 65 the drive 30 of the feed in device 1 is turned off. In the following step 66 it is tested whether a preset clearing time for example of 2.5 seconds has elapsed. If not, the testing step 66 is repeated in synchronism with the clock oscillator. Then after the clearing time has been reached, the comparing device 20b tests in step 67 whether the count of L-signals stored in the L-register of paging memory 20a equals the count of L-signals stored in L-register of camera intermediate memory 20b. If an unequality is detected then this condition is evaluated in step 68 as an L-error. If the counts of the stored signals in respective memories are equal, then in the step 69 it is tested whether the number or count of M-signals stored in the M-register of paging intermediate memory 20a equals to the count of M-signals stored in the M-register of camera intermediate memory 20c. If not, then in the following step 70 this condition is registered as an M-error. If an equality is detected then in the step 71 it is tested whether the count of K-signals stored in the K-register of paging intermediate memory 20a is equal to the count of K-signals stored in the K-register of camera memory 20c. If there is a difference then this condition is registered during step 72 as a K-error. If an equality is detected then in the following step 73 it is tested whether the count of O-signals stored in O-register of paging intermediate memory 20a equals to the count of O-signals in the O-intermediate memory 20c for the camera. If a difference is detected then this condition in step 74 is registered as a O-error. If the counts are equal then in the step 75 the L-, M-, K-, and O-registers in the paging intermediate memory 20a, and the L-, M-, K-, and O-registers of the intermediate memory 20c for the camera are cleared up. In the following step 76 the evaluation routine is started.

Figure 2D:
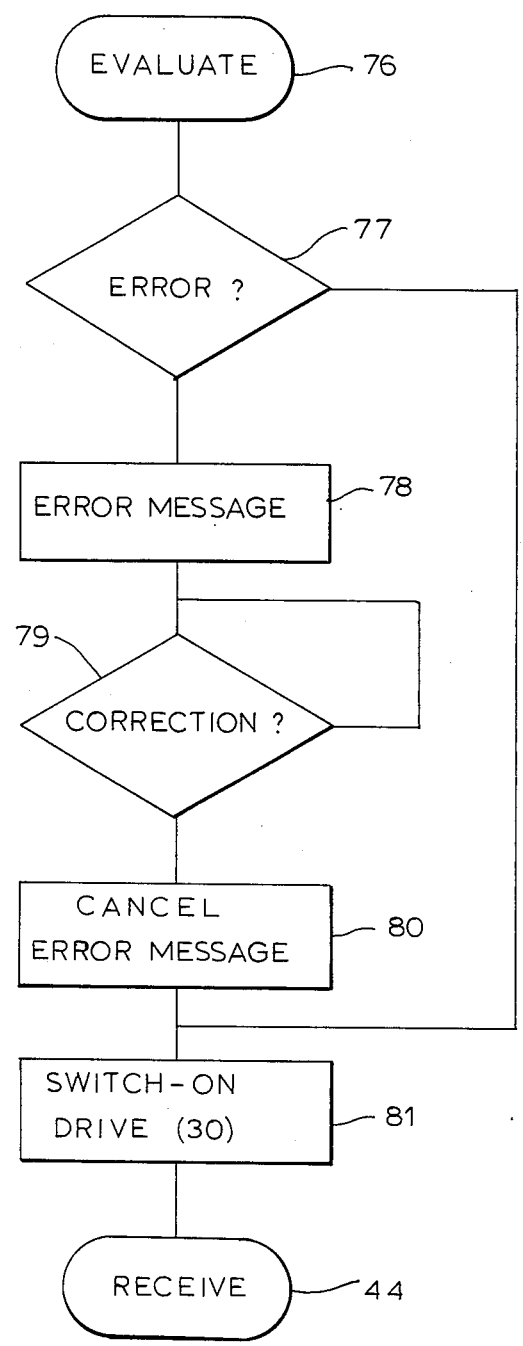

According to the flow chart of FIG. 2D after the start of the evaluation routine it is tested in step 77 whether an error has been registered or not. If an error is present then in step 78 an error message is issued. In the following step 79 it is tested whether the error condition has been corrected or not. If yes, then in step 80 the error message is cancelled.

Thereafter in step 81 the drive 30 is reactivated. The drive 30 is switched on also in the case when during step 77 no error has been detected. After the step 81 the process returns again to the signal reception routine 44 as shown in FIG. 2B.

It is evident that during each comparison in the course of the comparison subroutine all registers for the L-, M-, K-, and O-types of binary signals in respective intermediate memories 2a and 2c are compared as to their count irrespective whether an L-, M- or K-type coded signal is present or not. In the absence of L-, M- or K-type signals an O-type signal must be detected provided that the picturizing process runs without errors. In this manner it is possible to detect the presence or absence of the signals in the intermediate memory. Due to the fact that all registers in the intermediate memory are tested during the comparison, any error which may occur in the course of processing the document stack is detected after the beforementioned clearing time.

While the invention has been illustrated and described as embodied in a specific embodiment of a microfilm camera assembly, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. Method of monitoring the picture taking of documents in a microfilm camera assembly of the type having a paging device for printing serial page numbers on respective documents, an exposure device for exposing the paged documents and marking the film pictures thereof with light blips and a comparator for comparing a number of fed in documents with the number of film pictures and generate an error signal when a non-agreement is detected, the method comprising the steps of:
   providing each document during its passage through said paging device with a serial page number pertaining to a predetermined digital range;
   generating in response to each actuation of the paging device a binary coded first electrical signal whose code type indicates said digital range;
   then consecutively exposing the paged documents in said exposure device to make film pictures thereof and simultaneously exposing on each film picture a blip code correlated to said digital range;
   generating in response to each actuation of the exposure device a binary coded second electrical signal whose code type indicates said blip code;
   storing the binary coded first and second electrical signals in an intermediate memory until a preset count of the stored signals is reached;
   then reading out the stored signals and comparing in said comparator the first signals with the second ones; and
   issuing an error signal if a disagreement between the compared counts is detected or clearing said memory if an agreement is detected.

2. A method as defined in claim 1, wherein a plurality of digital ranges is assigned to different partial stacks of documents and a plurality of blip codes or blip code combinations is assigned to corresponding film pictures, at least one of the digital ranges and the correlated blip code or blip code combination is initiated by means of a coded control card preceding the corresponding partial stack, and the comparison step in said comparator is initiated after the passage of said control card through the camera.

3. A method as defined in claim 2, wherein the step of comparing said first and second signals is performed for the respective digital ranges and the corresponding blip codes or blip code combinations.

4. A method as defined in claim 2, wherein after the passage of documents corresponding to said preset count a further advance of the documents into said paging device is interrupted before said read out and comparing steps are performed.

5. A method as defined in claim 4, wherein in the case when a disagreement between the compared signals is detected the further advance of said documents into said paging device remains interrupted, and the paging device and the exposure device are automatically disconnected.

6. A method as defined in claim 2, wherein after a control card or the last document in said preset count has been discharged from said exposure device, said reading out and comparing steps are initiated after a predetermined waiting time interval.

7. A microfilm camera assembly for monitoring the picture taking of different groups of documents, comprising a paging device for printing serial numbers on the documents, an exposure device for taking film pictures of the documents and for exposing on the film pictures a blip code assigned to a digital range of the printed serial numbers, an intermediate memory, a comparator and an electronic control, said electronic control including a control unit and an evaluation unit cooperating respectively with said paging device, and a control unit and an evaluation unit cooperating respectively with said exposure device, said evaluation units of the electronic control receiving respectively binary coded first and second signals from said paging and exposure devices, said comparator being connected between said evaluation units and said intermediate memory to store a preset count of said first and second signals therein and after said preset count has been reached, to compare said first signals with said second signals to detect an agreement or disagreement of the binary codes.

8. A microfilm camera assembly as defined in claim 7, for continuously processing different partial stacks of documents, wherein said paging and exposure devices include respectively means for sensing a coded control card assigned to at least one of said partial stack of document, said sensing means delivering said binary coded first and second signals to said evaluation units of the electronic control.

9. A microfilm camera assembly as defined in claim 8, wherein said sensing means include bar code readers for reading said coded control cards in said paging device and in said exposure device.

10. A microfilm camera assembly as defined in claim 7, further comprising manually operated data input keyboards assigned respectively to said paging and exposure devices to enter a desired digital range code and a blip code therein, sensing means provided in said paging and exposure devices to sense the presence of a document therein and to signal the passage of respective documents to said evaluation units to control said preset count in said intermediate memory.

11. A microfilm camera assembly as defined in claim 10, wherein said sensing means include light barriers for detecting the presence of respective documents in said paging and exposure devices.

12. A microfilm camera assembly as defined in claim 10, wherein said keyboards serve for the entry of binary codes pertaining to the beginning of a partial stack of documents.

13. A microfilm camera assembly as defined in claim 7, wherein said control units of said electronic control are connected to said comparator to release an acoustic or optical warning signal when a disagreement between said stored first and second signals is detected.

14. A microfilm camera assembly as defined in claim 7, wherein said control units of the electronic control are interconnected with said comparator and said intermediate memory to inactivate the advance of said documents into said paging and exposure devices when a disagreement between stored signals is detected.

* * * * *